US009277028B2

(12) United States Patent
Ebner et al.

(10) Patent No.: US 9,277,028 B2
(45) Date of Patent: Mar. 1, 2016

(54) SYNCHRONIZING USER RELATIONSHIP ACROSS COMPUTER SYSTEMS IMPLEMENTING WORKSPACES

(71) Applicants: Rachel Ebner, Ra'anana (IL); Orly Bleier, Hod Hasharon (IL)

(72) Inventors: Rachel Ebner, Ra'anana (IL); Orly Bleier, Hod Hasharon (IL)

(73) Assignee: SAP Portals Israel Ltd, Ra'anana (IL)

( * ) Notice: Subject to any disclaimer, the term of this patent is extended or adjusted under 35 U.S.C. 154(b) by 276 days.

(21) Appl. No.: 13/760,300

(22) Filed: Feb. 6, 2013

(65) Prior Publication Data

US 2014/0222914 A1  Aug. 7, 2014

(51) Int. Cl.
*H04L 29/06* (2006.01)
*H04L 29/08* (2006.01)
*G06Q 10/10* (2012.01)

(52) U.S. Cl.
CPC .............. *H04L 67/306* (2013.01); *G06Q 10/10* (2013.01)

(58) Field of Classification Search
CPC ... G06Q 10/10; H04L 29/06; H04L 29/08072
USPC ........................................................ 709/204
See application file for complete search history.

(56) References Cited

U.S. PATENT DOCUMENTS

| 6,871,232 | B2 * | 3/2005 | Curie et al. ................... 709/225 |
| 7,444,390 | B2 * | 10/2008 | Tadayon et al. ................ 709/219 |
| 7,548,957 | B1 | 6/2009 | Wichmann et al. |
| 7,634,539 | B2 | 12/2009 | Schwarz et al. |
| 7,873,942 | B2 | 1/2011 | Shaburov et al. |
| 8,015,240 | B2 | 9/2011 | Ng et al. |
| 8,214,747 | B1 * | 7/2012 | Yankovich et al. ........... 715/751 |
| 8,291,214 | B2 | 10/2012 | Helfman et al. |
| 8,296,667 | B2 | 10/2012 | Tewari et al. |
| 8,332,471 | B2 | 12/2012 | Harple et al. |
| 8,464,161 | B2 | 6/2013 | Giles et al. |
| 8,812,702 | B2 | 8/2014 | Mendez et al. |
| 2002/0147801 | A1 * | 10/2002 | Gullotta et al. ............... 709/223 |
| 2006/0136999 | A1 | 6/2006 | Kreyscher et al. |
| 2006/0218000 | A1 * | 9/2006 | Smith et al. ....................... 705/1 |
| 2008/0256458 | A1 | 10/2008 | Aldred et al. |
| 2009/0150981 | A1 * | 6/2009 | Amies et al. ....................... 726/5 |
| 2011/0162074 | A1 | 6/2011 | Helfman et al. |

(Continued)

OTHER PUBLICATIONS

U.S. Appl. No. 13/597,632, filed Aug. 29, 2012, entitled "Enterprise Workspaces Externalization"; 32 pages.

(Continued)

*Primary Examiner* — Nicholas Taylor
*Assistant Examiner* — Chong G Kim
(74) *Attorney, Agent, or Firm* — Fish & Richardson P.C.

(57) ABSTRACT

Computer-implemented methods, computer software, and computer systems for synchronizing user relationship across computer systems implementing workspaces. A computer system that provides features accessible by users by executing a workspace is accessed. Features provided to the users by remaining computer systems depends on the relationships between the users. A triggering event that represents a change to the computer workspace—for example, addition or removal or a user in the workspace, addition or removal of content in the workspace—is detected. Features provided to a first user by the remaining computer systems is affected by the change. Changes in relationships between the first user and the remaining users responsive to the change are determined, and provided to one or more of the remaining computer systems as respective messages that include the changes in the relationships.

15 Claims, 8 Drawing Sheets

(56) References Cited

U.S. PATENT DOCUMENTS

| | | |
|---|---|---|
| 2011/0231592 A1 | 9/2011 | Bleier et al. |
| 2012/0054639 A1 | 3/2012 | Shi et al. |
| 2013/0041835 A1* | 2/2013 | Thompson et al. .......... 705/322 |
| 2013/0198184 A1 | 8/2013 | Wu et al. |
| 2014/0052839 A1 | 2/2014 | Anuff et al. |
| 2014/0123020 A1 | 5/2014 | Bleier et al. |
| 2014/0222914 A1 | 8/2014 | Ebner et al. |

OTHER PUBLICATIONS

U.S. Appl. No. 13/660,698, filed Oct. 25, 2012, entitled "Multiple User Interface Platform Support for Portal Applications", 42 pages.

* cited by examiner

SYNCHRONIZING USER RELATIONSHIP ACROSS COMPUTER SYSTEMS IMPLEMENTING WORKSPACES

TECHNICAL FIELD

The present disclosure relates to software, computer systems, and computer-implemented media for synchronizing computer systems.

BACKGROUND

Enterprise Workspace (EWS) technology leverages existing enterprise portal (EP) capabilities and acts as an "add-on" to EP technology. For example, EWS user interface (UI) technology can run on top of existing EP technology. EWS functionality can provide a flexible, intuitive environment for single EWS users or groups of EWS users (or both) to create, integrate, organize, compose, modify, and delete content, through the use of modules, both structured and unstructured, on EWS pages within an EWS. EWS technology can allow EWS users to take advantage of a "self-service" approach that is a decentralized approach in assembling content on EWS pages, often without involvement by an enterprise's information technology group.

EWS users can be assigned permissions and roles that, in conjunction with a permission/role policy, can determine content that a user can access in the EWS. Sometimes, a role assigned to an EWS user can be modified (for example, a new role can be added, or an existing role can be deleted or changed). Such a modification can result in a change in a relationship between the EWS user whose role was modified and other EWS users. If all computer systems that receive content from or provide content to the computer system executing the EWS are not synchronized to reflect the change in the user relationships, then some EWS users may gain access to unauthorized content or be denied access to authorized content or both.

SUMMARY

The present disclosure involves systems, software, and computer-implemented methods for synchronizing user relationships across computer systems implementing workspaces.

In general, one innovative aspect of the subject matter described here can be implemented as a method performed by data processing apparatus. A first computer system that provides features accessible by multiple users is accessed. The first computer system executes a computer workspace that defines relationships between the multiple users. The first computer system is included in multiple computer systems. Features provided to the multiple users by remaining computer systems of the multiple computer systems depend on the relationships between the multiple users. A triggering event that represents a change to the computer workspace is detected. It is determined that the features provided to a first user of the multiple users by the remaining computer systems are affected by the change to the computer workspace. Changes in relationships between the first user and the remaining users responsive to the change to the computer workspace are determined. A respective message that includes the changes in the relationships between the first user and the remaining users is provided to one or more of the remaining computer systems, in response to the triggering event being detected.

This, and other aspects, can include one or more of the following features. The change to the computer workspace can be a change in a relationship between a first user and remaining users of the multiple users. Providing, to the remaining computer systems, a respective message can include generating a respective message that is specific to each of the remaining computer systems. Providing, to the remaining computer systems, a respective message can include generating a common message for the remaining computer systems. The change to the computer workspace can be addition or removal of one or more features provided by the workspace. Features that are provided by the remaining computer systems and that should be accessible to the first user based on the addition or removal of the one or more features provided by the workspace can be determined. A respective message that is specific to each of the remaining computer systems can be generated. The providing of respective messages to the remaining computer systems can be tracked. The tracking can include tracking to determine that a respective message has been generated, and tracking to determine that the generated message has been provided to a remaining computer system. The tracking can include at least one of determining that a generation of a respective message has not started, determining that the generation of the respective message is in progress, determining that a providing of the respective message has failed, determining that the providing of the respective message has succeeded, or determining that a failed message needs to be resent. In a display device, a user interface for tracking the providing of respective messages to the remaining computer systems can be displayed.

Another innovative aspect of the subject matter described here can be implemented as a computer-readable medium storing instructions executable by data processing apparatus to perform operations described here. A further innovative aspect of the subject matter described here can be implemented as a system that includes data processing apparatus, and a computer-readable medium storing instructions executable by the data processing apparatus to perform operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

A computer system can implement an external facing enterprise portal (EP) or a workspace that allows multiple users to access content that is not only available through the portal or the workspace, but also provided by other interconnected computer systems. The workspace can experience two types of changes—changes to users who can access the workspace or changes to content accessible through the workspace (or both). Both types of changes can affect relationships between users of the computer system. When the computer system is connected to other backend computer systems, the effect of the changes to the relationship between the users across the interconnected computer systems (for example, a computer system that implements another enterprise portal, a computer system that implements a customer relationship management application, and others) can be more significant. Each of the interconnected computer systems may not share the same user base. Even if they do, a user may need to obtain permissions and privileges separately from each interconnected computer system. This disclosure describes a relationship manager that can synchronize relationships across computer systems that implement workspaces.

Exemplary problems that can arise due to the changes in the workspace are described here. In one example problem, users may be added to a frontend computer system that implements the workspace by a self-registration process. In this process, the frontend computer system can assign a user account to a user in response to receiving details about the user. The user account can carry certain privileges that can determine, for example, content that the user can or cannot access. In some situations, the user's request for the user account may need to be approved by an administrator of the frontend computer system, who can modify (for example, add or change or both) the user's credentials or who can deny the user's request for the account. In some situations, a user can be assigned an account in response to a "registration by invitation" process, in which an existing user of the frontend computer system invites an external user to join, for example, the workspace implemented by the frontend computer system to access certain content and applications provided by the workspace. The external user can receive an invitation, for example, via e-mail, and then implement the self-registration process described above. The backend computer systems that are interconnected with the frontend computer system need to be updated to reflect the new users.

For example, in the "registration by invitation" workflow, a manual and selective process of permission settings may be implemented. The user who is being invited may be assigned a particular role, for example, a business role of a doctor from an external organization invited to view some medical records visible in the workspace. A role, as used in this disclosure, can be one of several special roles that are applicable to a user in particular contexts of the workspace. This is in contrast to system-wide roles that are applicable anywhere in the system. Such system-wide roles exist in many systems. The relationship manager—described below—can enable backend computer systems to determine permissions that can be assigned to the user based on the user's business role, the identity of the workspace implemented by frontend computer system, and the identity of other users who are members in that workspace.

In another example problem, users of the workspace implemented by the frontend computer system can be assigned different business roles or functions. The different assignments can imply that a relationship has been formed between these users in the workspace. The type of relationship can be defined by the specific business scenario that the workspace was designed to serve. For example, the workspace can be a central point for a patient to view all medical data and health maintenance activities. User X in the workspace can be the patient, user Y can be a doctor, and user Z can be a family member. From this assignment of roles, two relationships can be derived for this workspace—user Y is the doctor of user X, and user Z is a family member of user X.

In a different business case, the workspace can have been designed to share data about a medical condition, such as general information about diabetes. User X, in this workspace, can be a patient, and users Y and M can be doctors. From this assignment of roles, the following relationships can be derived—user Y is a colleague of user M, user M is a colleague of user Y, but users Y and M need not be doctors of user X. This illustrates the effect of the business context of a workspace on the types of relationships between users.

Thus, when new users are added to a workspace or removed from it, a change in the relationships between users in the frontend computer system results. New users added to the frontend computer system can be existing users already defined either in the frontend computer system or one of the backend computer systems or can be new users as yet undefined in any of the interconnected computer systems. The relationship manager described here can synchronize the interconnected computer systems in a reliable manner and in the relevant business context.

A further example problem can arise when the frontend computer system adds content, for example, a business application, to the workspace. Sometimes, users of the workspace may not have permissions to access the content. The administrator may need to assign permissions to all workspace users in the backend, for example, manually. The relationship manager described here can synchronize the frontend computer system, the backend computer systems, and the administrator by notifying the administrator of the addition of the content. Thus, in general, the relationship manager described here can notify interconnected computer systems of changes to a workspace implemented by one of the computer systems. The relationship manager can synchronize the relationships between users of the computer system implementing the workspace and other interconnected computer systems by implementing techniques described with reference to the following figures.

Figure 1:
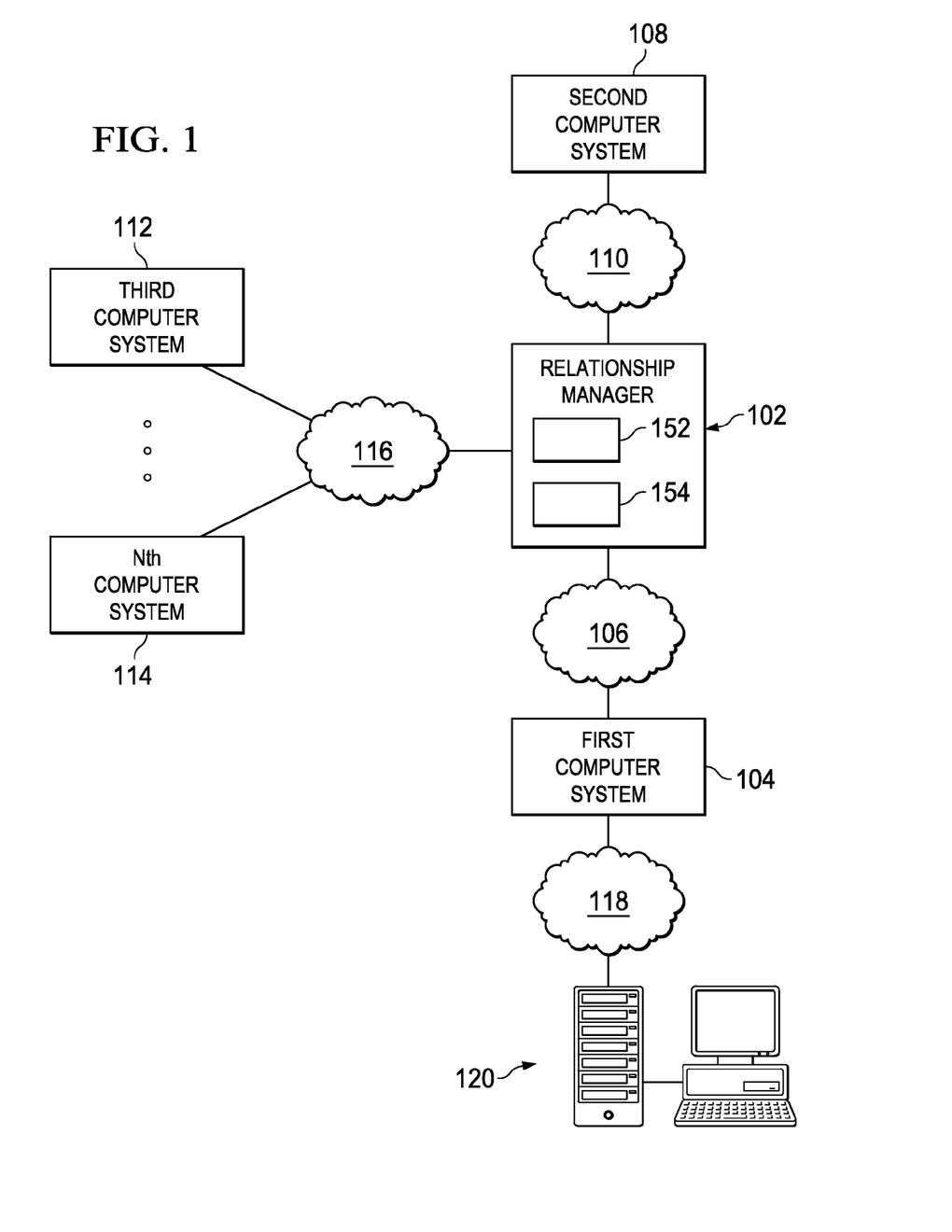
FIG. 1 illustrates an example of a relationship manager interconnected with computer systems that implement business applications.

FIG. 1 illustrates an example of a relationship manager 102 interconnected with computer systems that implement business applications. The relationship manager 102 can be implemented as computer-readable instructions stored on a computer-readable medium 152 and executable by data processing apparatus 154 to perform operations described here. The interconnected computer systems can include a first computer system 104 connected to the relationship manager 102 through one or more networks 106, for example, the Internet. The interconnected computer systems can also include a second computer system 108 connected to the relationship manager 102 through one or more networks 110, for example, the Internet. The first computer system 104 and the second computer system 108 can be a frontend computer system and a backend computer system, respectively, or vice versa.

The relationship manager 102 can additionally be connected to multiple other computer systems, for example, a third computer system 112 up to an $N^{th}$ computer system 114.

The other computer systems can be connected to the relationship manager using one or more networks 116, for example, the Internet. Some or all of the computer systems that are connected to the relationship manager 102 can implement a workspace as computer software instructions stored on computer-readable media and executable by one or more data processing apparatuses. A workspace can be a collaboration component that resides on the computer system (for example, the frontend computer system) and exposes specific business data from other computer systems (for example, backend computer systems). In some implementations, the relationship manager 102 can be implemented as a stand-alone computer system, while, in others, it can be implemented as a component of one of the interconnected computer systems, for example, the first computer system 104.

In some implementations, the first computer system 104 (i.e., the frontend computer system, in the above example implementation) can be connected to a client computer system 120 through one or more networks 118, for example, the Internet. A user can access the workspace implemented by the first computer system 104 using the client computer system 120. For example, the first computer system 104 can display a portal on a display device of the client computer system 120 through which the user can access content provided by the workspace.

The relationship manager 102 can access the first computer system 104 that provides features (for example, content) accessible by multiple users by executing a computer workspace that defines relationships between the multiple users. As shown in FIG. 1, the first computer system 104 is included in multiple computer systems. Features (for example, the content) provided to the multiple users by remaining computer systems of the multiple computer systems (for example, the second computer system 108, the third computer system 112, and so on up to the $N^{th}$ computer system 114) depend on the relationships between the multiple users. As described above, the first computer system 104 can have assigned user accounts to the multiple users. Similarly, each of the remaining computer systems can also have assigned user accounts to multiple other users, which can include some or all of the multiple users or different users. The first computer system 104 can also have assigned one or more roles to the multiple users. The roles assigned to the users in the context of the workspace and resulting relationships between the users can define a business context of the workspace implemented by the first computer system 104. When an event triggers a change in the workspace, the relationship manager 102 can synchronize the user relationship between the many interconnected computer systems shown in FIG. 1.

In some implementations, the relationship manager 102 can detect a triggering event that represents a change to the computer workspace implemented by the first computer system 104. Alternatively, or in addition, the computer system 104 can trigger or invoke the relationship manager 102, for example, explicitly, whenever a change in user relationship occurs. As described with reference to FIGS. 2A and 2B, the change to the computer workspace can be a change in a relationship between a first user and remaining users of the multiple users. As described with reference to FIGS. 3A and 3B, the change to the computer workspace can be an addition or removal of content to the workspace. For example, when content is added to the workspace implemented by the computer system 104, then the relationship manager 102 can notify the second computer system 108 (and other interconnected computer systems) of all the user relationships in that workspace that should be applied to the added content.

Returning to the example described with reference to FIGS. 2A and 2B, the relationship manager 102 can detect that the first computer system 104 has added the first user as a new user to the workspace. The first computer system 104 can have assigned a "doctor" role to the first user. Alternatively, the first computer system 104 can have removed the first user from the workspace. The first computer system 104 can have modified a role assigned to the first user, for example, from a "doctor" role to an "accounts manager" role. The role assigned to the first user can affect a relationship between the first user and the multiple remaining users.

If the first computer system 104 has assigned a "patient" role to a second user, then the first user, to whom the first computer system 104 has assigned a "doctor" role, can have a "doctor-patient" relationship with the second user. This relationship can allow the first user to view confidential health-related information about the second user in the workspace. If the first user's role as a "doctor" is revoked, then the relationship between the first and second user is no longer a "doctor-patient" relationship. Consequently, the first user may no longer be permitted to view the confidential health-related information.

The second computer system 108 can implement a business application which the second user has permission to access. The second computer system 108 can assign a "patient" role to the second user that is similar to the "patient" role assigned to the second user by the first computer system 104. When the role that the first computer system 104 assigns to the first user changes, as described above, the relationship manager 102 determines that the features (for example, the content) provided to the first user by the second computer system 108 is affected by the change to the computer workspace (i.e., the change of the first user's role, in this example). The relationship manager 102 can determine changes in relationships between the first user and the second user responsive to the change to the computer workspace, and provide, to the second computer system 108, a message that includes the change in the relationship between the first user and the second user. The relationship manager 102 can do so in response to detecting the triggering event that represents the change to the computer workspace.

The example implementation of the relationship manager 102 is described above with reference to two users (i.e., the first user and the second user) and two computer systems (i.e., the first computer system 104 and the second computer system 108). The relationship manager 102 can similarly be implemented to determine changes in relationships between the first user and multiple remaining users in the context of the workspace implemented by the frontend computer system, and provide, to one or more of the remaining computer systems, a respective message that includes the changes in the relationships between the first user and the remaining users.

In some implementations, the relationship manager 102 notifies the second computer system 108 of the change. To do so, in some implementations, the relationship manager 102 can provide to the second computer system 108, a message that is specific to the second computer system 108. For example, the relationship manager 102 can have determined that the second user is a user of the workspaces implemented by the first computer system 104 and the second computer system 108. The relationship manager 102 can also identify a format in which the second computer system 108 can receive relationship change notification messages. The relationship manager 102 can generate a relationship change notification message according to the format of the second computer system 108, and transmit the message to the second computer system 108. In some implementations, the relationship change notification message can be an asynchronous message that can be sent via one or more protocols such as Java Message Service (JMS) protocol, web service, or other protocols. In some implementations, the relationship change notification can be a synchronous call. In addition, the content of the notification message can vary between implementations. For example, the content can be a high-level message, such as "user X is doctor of patient Y," or a message containing detailed information on the permissions that need to be provided, such as "Provide user X the permission to access data A/application B/table C and filter only data relevant to user Y."

The second user can be associated with multiple other computer systems (for example, the third computer system 112, a fourth computer system). The relationship manager 102 can identify a respective format in which each of the multiple other computer systems receives relationship change notification messages. The relationship manager 102 can generate a relationship change notification message according to each format, and transmit the messages to the respective computer systems. Alternatively, or in addition, the relationship manager 102 can generate a single common relationship change notification message, and transmit the message to all computer systems that are connected to the first computer system 104. In other words, the relationship manager 102 can generate multiple relationship change notification messages, each of which has the same message format, and can transmit each relationship change notification message separately to each computer system.

Each computer system that receives a relationship change notification message from the relationship manager 102 can respond to the relationship change, for example, by assigning, revoking, modifying (or a combination thereof) permissions to the second user based on the relationship change. For example, when the relationship manager 102 notifies the second computer system 108 that the second user has been assigned a "doctor" role in the first computer system 104, then the second computer system 108 can generate a new relationship between the second user and the first user, namely, a "doctor-patient" relationship.

In some implementations, the change to the computer workspace implemented by the first computer system 104 can be an addition or removal of one or more features (for example, content) provided by the workspace, as described below with reference to FIGS. 3A and 3B. For example, a manager of the workspace can add content (for example, a business application, a spreadsheet, an image, and the like) to the workspace. Alternatively, or in addition, the manager can remove the business application. The relationship manager 102 can determine content that is provided by the remaining computer systems and that should be accessible to the first user of the workspace implemented by the first computer system 104 based on the addition or removal of the one or more features provided by the workspace. The relationship manager 102 can generate a respective message that is specific to each of the remaining computer systems, and provide the message to the computer systems.

For example, the business application can define the first user as a "central" user, i.e., the workspace owner or the user who changed the content or any other user in the workspace. For all users in the workspace, the relationship manager 102 can evaluate permissions that should be assigned to the first user on the remaining computer systems as well as the specific resources that should be assigned to the first user. The relationship manager 102 can transmit a message or messages, for example, asynchronous messages, to inform the remaining computer systems of the permission change for the first user on the first computer system 104. As described above, the relationship manager 102 can design each message specifically for each computer system and for the application programming interface (API) of each computer system. Also, as described above, each remaining computer system that receives a message from the relationship manager 102 can respond to the permission change and assign, revoke, modify (or combinations thereof) permissions to the first user of each remaining system's respective computer workspace.

Figure 2A:
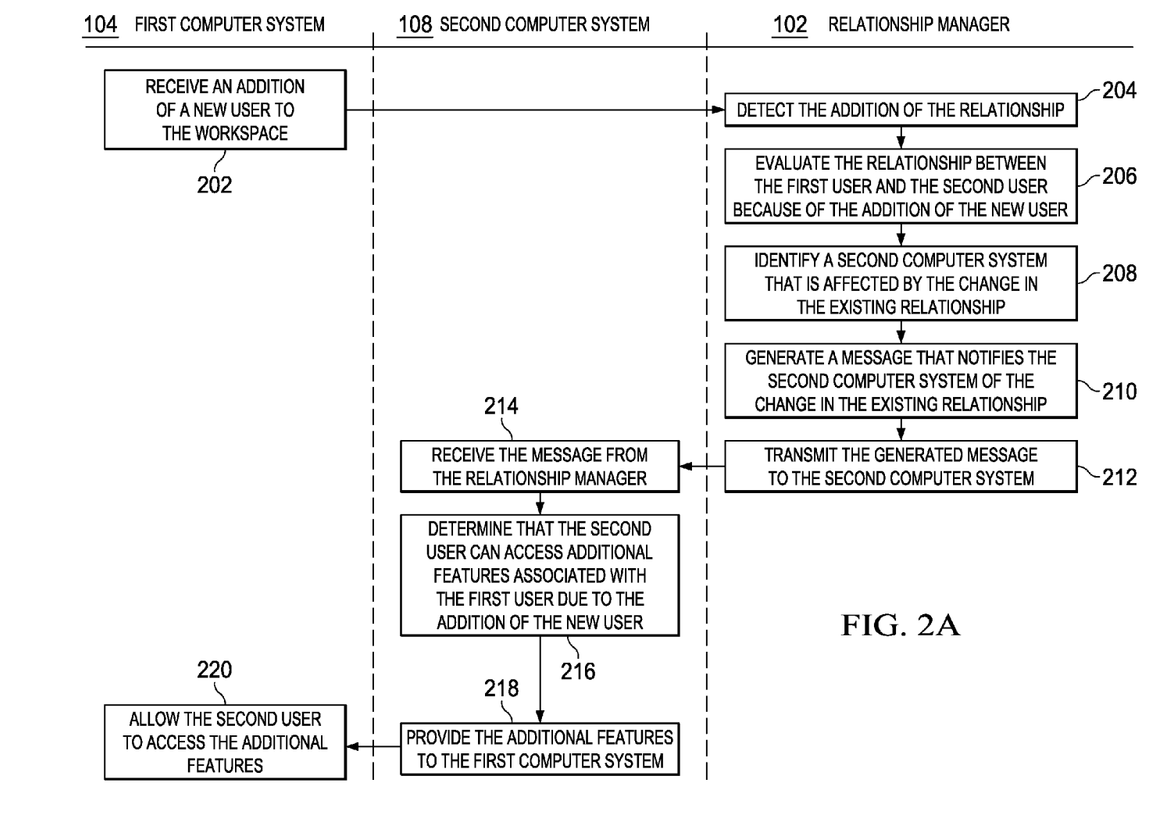
FIGS. 2A and 2B are lane diagrams illustrating example operations to synchronize user relationships between two computer systems of FIG. 1.

FIG. 2A is a lane diagram illustrating example operations to synchronize user relationships between two computer systems of FIG. 1 when the first computer system 104 adds a new user to the workspace with a business role in the workspace. At 202, the first computer system 104 can receive an addition of a relationship between a first user and a second user in the workspace. At 204, the relationship manager can detect the addition of the new user. Alternatively, the relationship manager can be invoked by the first computer system 104 to detect the addition of the new user. At 206, the relationship manager 102 can evaluate the relationship between the first user and the second user because of the addition of the new user. For example, the relationship manager 102 can evaluate the relationship between the two users in the context of the workspace to determine whether a relationship exists and a type of the relationship. At 208, the relationship manager 102 can identify a second computer system 108 that is affected by the change in the existing relationship. At 210, the relationship manager 102 can generate a message that notifies the second computer system of the change in the existing relationship, and, at 212, transmit the generated message to the second computer system 108. As described above, this message can be custom-designed for the second computer system 108 and the APIs that the second computer system 108 implements or can be a common message that can be sent to all interconnected computer systems.

At 214, the second computer system 108 can receive the message from the relationship manager 102. At 216, the second computer system 108 can determine that the second user can access additional features (i.e., content) associated with the first user due to the addition of the new user. For example, the second computer system 108 can determine that a "doctor-patient" relationship has been added between the first user and the second user in the workspace implemented by the first computer system 104. Consequently, the first user (i.e., the user assigned the "doctor" role) is authorized to access confidential information associated with the second user (i.e., the user assigned the "patient" role) that is included in the business application implemented by the second computer system 108. At 218, the second computer system 108 can provide the additional features to the first computer system 104. At 220, the first computer system 104 can allow the second user to access the additional features.

Figure 2B:
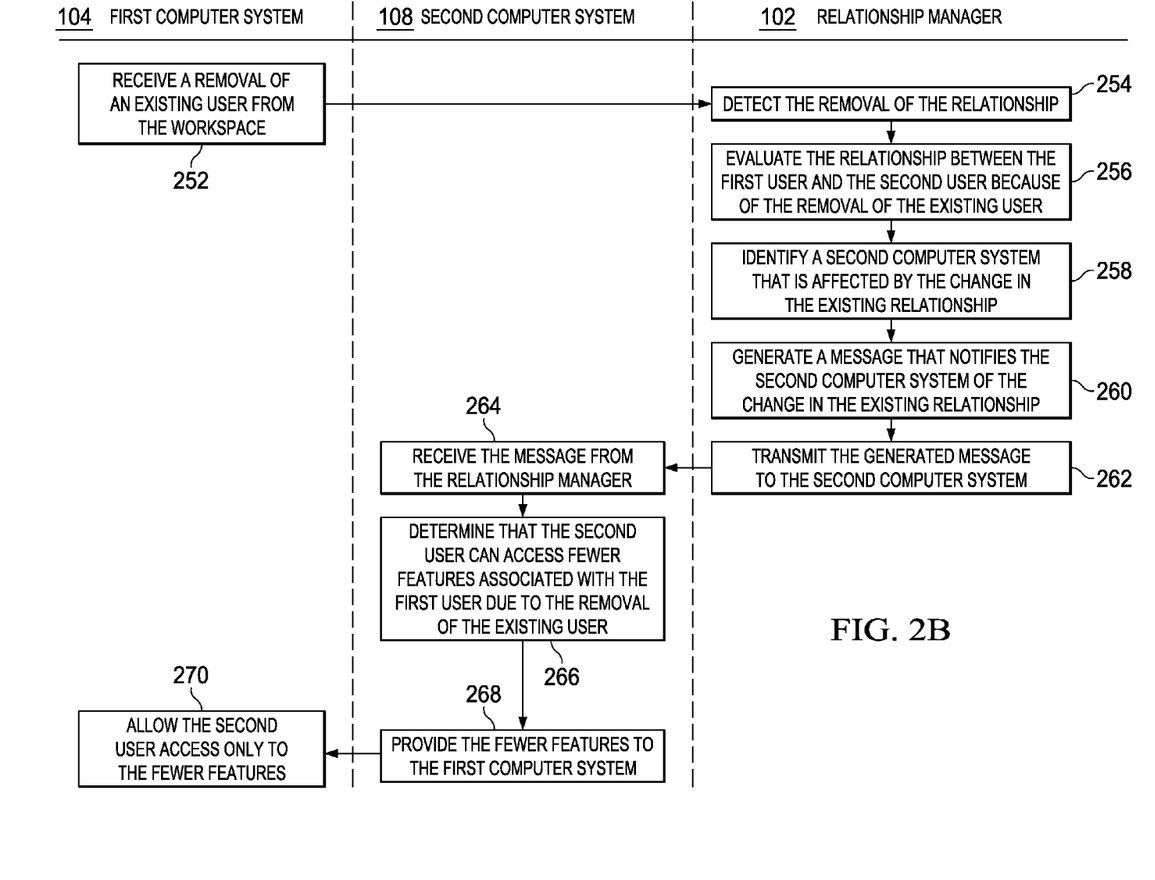

FIG. 2B is a lane diagram illustrating example operations to synchronize user relationships between two computer systems of FIG. 1 when the first computer system 104 removes an existing user who has a business role from the workspace. At 252, the first computer system 104 can receive instructions relating to removal of an existing user from the workspace. At 254, the relationship manager can detect the removal of the existing user. Alternatively, the first computer system 104 can invoke the relationship manager to detect the removal of the existing user. At 256, the relationship manager 102 can evaluate a change in the existing relationship between the first user and the second user because of the removal of the existing user. For example, the relationship manager 102 can evaluate whether removing the existing user affects content accessible to either or both users. At 258, the relationship manager 102 can identify a second computer system 108 that is affected by the change in the existing relationship. At 260, the relationship manager 102 can generate a message that notifies the second computer system 108 of the change in the existing relationship, and, at 262, transmits the generated message to the second computer system 108. As described above, this message can be custom-designed for the second computer system 108 and the APIs that the second computer system 108 implements or can be a common message that can be sent to all interconnected computer systems.

At 264, the second computer system 108 can receive the message from the relationship manager. At 266, the second computer system 108 can determine that the second user can access fewer features (i.e., content) associated with the first user due to the removal of the existing user. For example, the second computer system 108 can determine that a "doctor-patient" relationship has been removed between the first user and the second user in the workspace implemented by the first computer system 104. Consequently, the first user (i.e., the user assigned the "doctor" role) is no longer authorized to access confidential information associated with the second user (i.e., the user assigned the "patient" role) that is included in the business application implemented by the second computer system 108. At 268, the second computer system 108 can provide the fewer features to the first computer system 104. At 270, the first computer system 104 can allow the second user access to only the fewer features.

As described above, the second computer system 108 can determine that the second user can access additional features associated with the first user due to the addition of the new user 216. In response, the second computer system 108 can include required permission changes to provide the second user access to the additional features in a queue and seek permission, for example, from a human administrator, to implement the permission changes. Similarly, the second computer system 108 can determine that the second user can access fewer features associated with the first user due to the removal of the existing user 266. In response, the second computer system 108 can include required permission changes to deny the second user access to existing features in a queue and seek permission from the administrator to implement the permission changes.

Figure 3A:
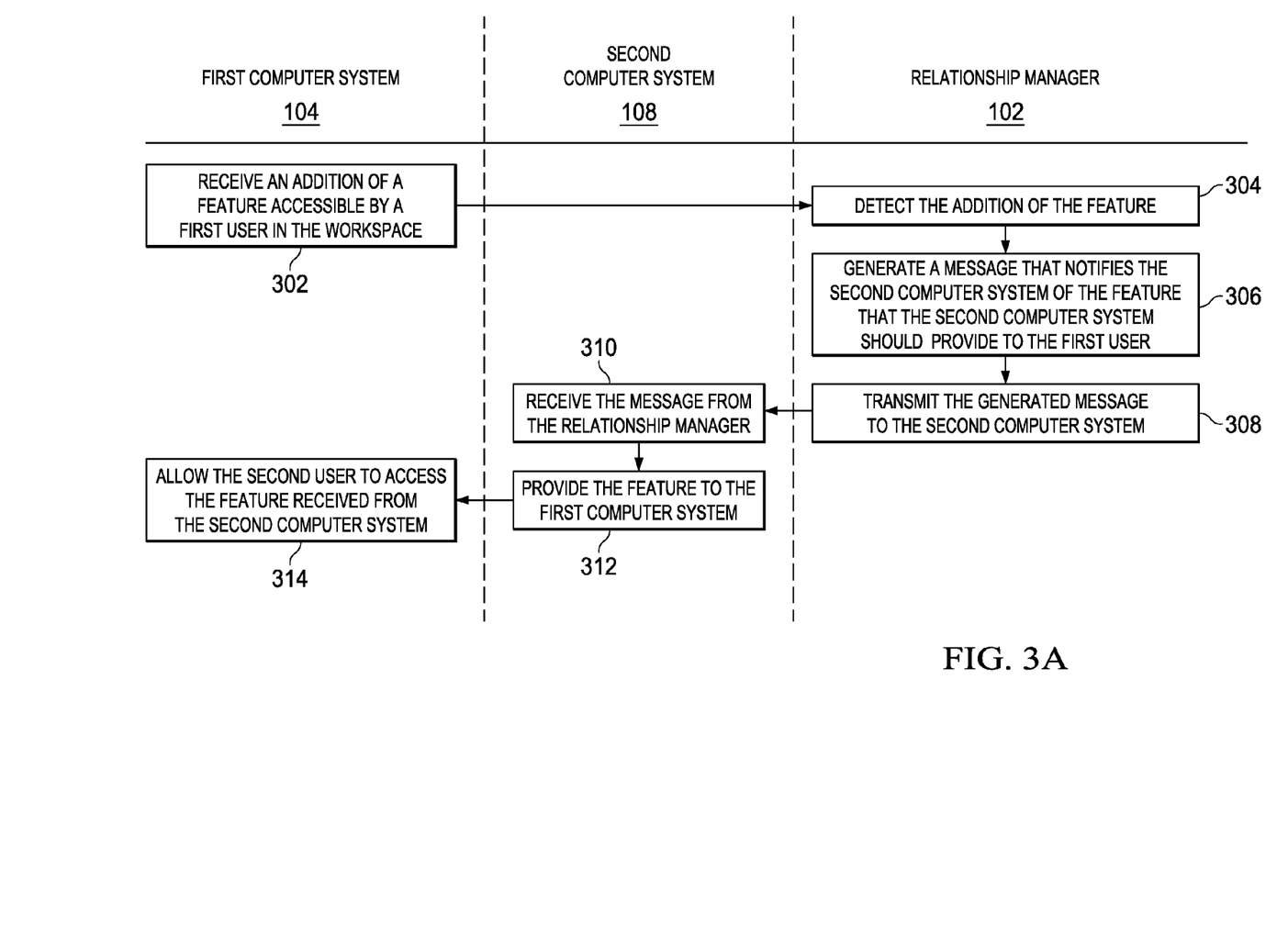
FIGS. 3A and 3B are lane diagrams illustrating example operations to synchronize user relationships between two computer systems of FIG. 1.

FIG. 3A is a lane diagram illustrating example operations to synchronize user relationships between two computer systems of FIG. 1 when content is added in a workspace implemented by the first computer system 104. Content added to the workspace can include data or an application that can retrieve data from a backend computer system or both. At 302, the first computer system 104 can receive addition of a feature accessible by a first user in the workspace. At 304, the relationship manager 102 can detect the addition of the feature or be notified directly by the first computer system 104. When the content is added to the workspace, the computer system from which data is to be obtained is identified. The relationship manager 102 can evaluate the permissions that should be assigned to a first user on the remaining computer systems and specific resources that are to be accessible to the first user. At 306, the relationship manager 102 can generate a message that notifies the second computer system 108 of the feature that the second computer system 108 should provide to the first user. In some implementations, the relationship manager 102 can review the roles and permissions of all users, determine the relationships between the users, and, if relationships exist, notify the second computer system 108 (and other interconnected computer systems) that provide content or features about the relationships. At 308, the relationship manager 102 can transmit the generated message (or messages) to the second computer system 108. For example, the relationship manager 102 can send one message with all the information or several messages, each including some information about the relationships. At 310, the second computer system 108 can receive the message (or messages) from the relationship manager 102, and, at 312, provide the feature to the first computer system 104. At 314, the first computer system 104 can allow the second user to access the feature received from the second computer system 108.

Figure 3B:
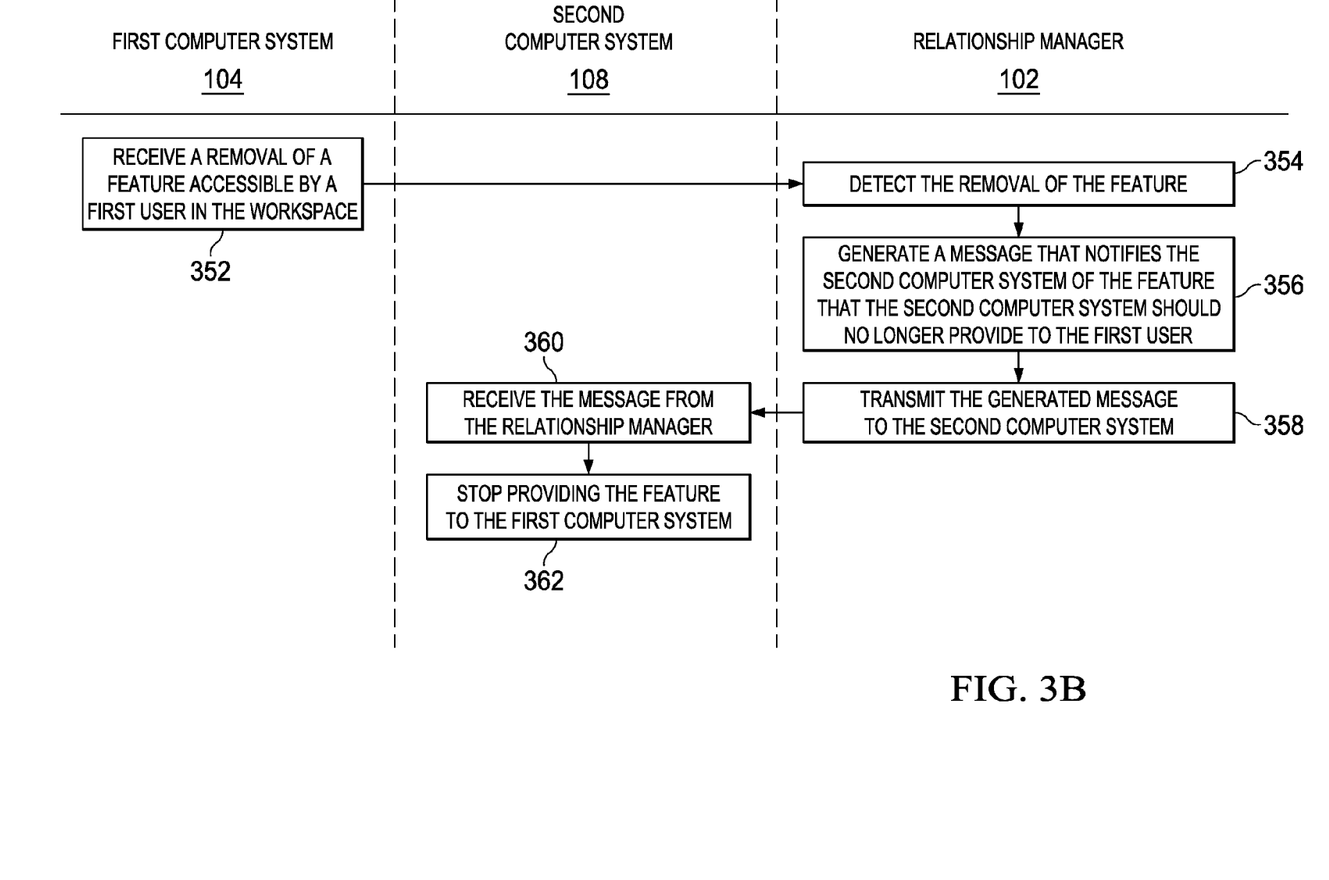

FIG. 3B is a lane diagram illustrating example operations to synchronize user relationships between two computer systems of FIG. 1 when content is removed from a workspace implemented by the first computer system 104. At 352, the first computer system 104 can receive a removal of a feature accessible by a first user in the workspace. At 354, the relationship manager 102 can detect the removal of the feature or be notified by the first computer system 104. At 356, the relationship manager 102 can generate a message (or messages) that notify the second computer system 108 of the feature that the second computer system 108 should no longer provide to the first user. At 358, the relationship manager 102 can transmit the generated message (or messages) to the second computer system 108. At 360, the second computer system 108 can receive the message from the relationship manager 102, and, at 362, stop providing the feature to the first computer system 104. In some implementations, the second computer system 108 can determine the features that are to be provided to the first computer system 104 or denied to the first computer system 104 in a respective queue, and seek permission, for example, from an administrator to implement the providing or denial of the features.

Returning to FIG. 1, the relationship manager 102 can implement certain administration operations associated with operations to synchronize user relationships between interconnected computer systems. In some implementations, the relationship manager 102 can track the providing of respective messages to the remaining computer systems. The relationship manager 102 can determine that a respective message has been generated, and additionally determine that the generated message has been provided to a remaining computer system (for example, the second computer system 108).

In some implementations, the relationship manager 102 can track the status of all asynchronous messages and mark each message as one of "not started," "in process," "failed," or "succeeded." By doing so, the relationship manager 102 can determine either that a generation of a message to a computer system has not started or that the generation is in progress or that the generation (or the transmission) of the message has failed or that the generation (or the transmission or both) has succeeded or that the message that failed to be transmitted needs to be resent. In some implementations, the relationship manager 102 can provide a user interface for tracking the providing of respective messages to the remaining computer systems. For example, the relationship manager 102 can display the user interface, described with reference to FIG. 4, in a display device of the client computer system 120.

Figure 4:
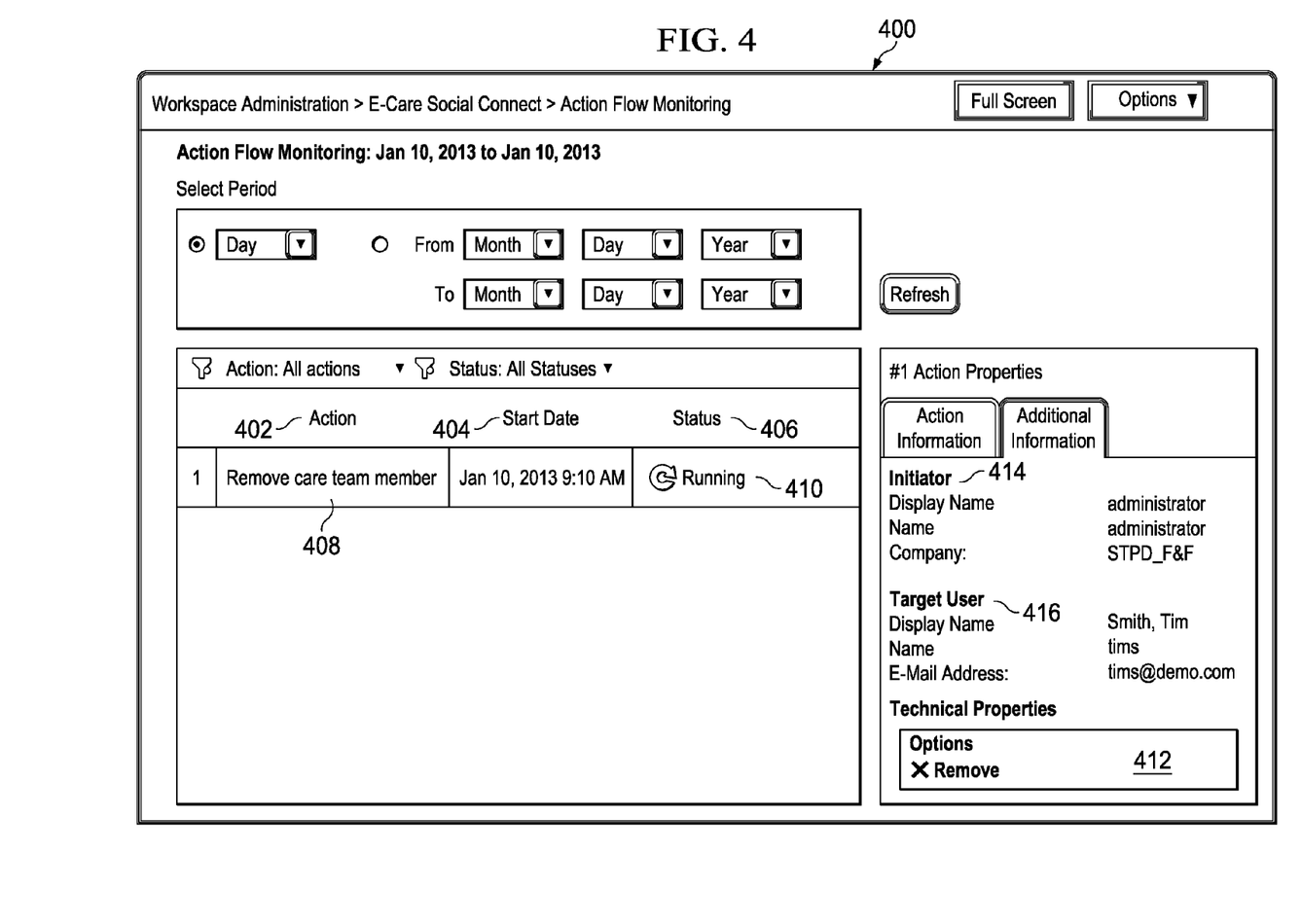
FIG. 4 is an example user interface through which user relationship synchronization can be performed.

FIG. 4 is an example user interface 400 through which user relationship synchronization can be performed. The relationship manager 102 can implement the user interface 400 as computer instructions stored on the computer-readable medium 152 and executable by the data processing apparatus 154. A user of a workspace (for example, the workspace implemented by the first computer system 104) is using the example user interface 400 to remove another user from the workspace. The user interface 400 includes an "Action" portion 402 that displays a name of the action that the user is performing. For example, the "Action" portion in user interface 400 displays the name "Remove care team member" 408. The user interface 400 includes a "Start Date" portion 404 that displays a time to perform the action. For example, the "Start Date" portion 404 in user interface 400 displays "Jan. 10, 2013 9:10 AM" as the start date to remove the care team member. The user interface 400 includes a "Status" 406 portion that displays a status of the process of generating a message that includes a change in relationships between the care team member being removed and other users of workspaces implemented by the interconnected computer systems and transmitting the message to the remaining computer systems. For example, the "Status" portion 406 in user interface displays "Running" 410 as a status of the generating and the transmitting. The user interface 400 additionally displays details about the user who is initiating the change and the user whose relationship is being changed in the "Action Properties" portion 412. In the portion 412, the user interface 400 displays an "Initiator" section 414 that includes details about the initiating user and a "Target User" section 416 that includes details about the target user, i.e., the user whose relationships are being changed. The portion 412 can include additional information about the users, the relationships, and other technical properties that can be viewed by scrolling the portion 412 using a scrollbar. In some implementations, the portion 412 can include options that the initiating user has to modify relationships between the target user and other users of the workspaces.

Figure 5:
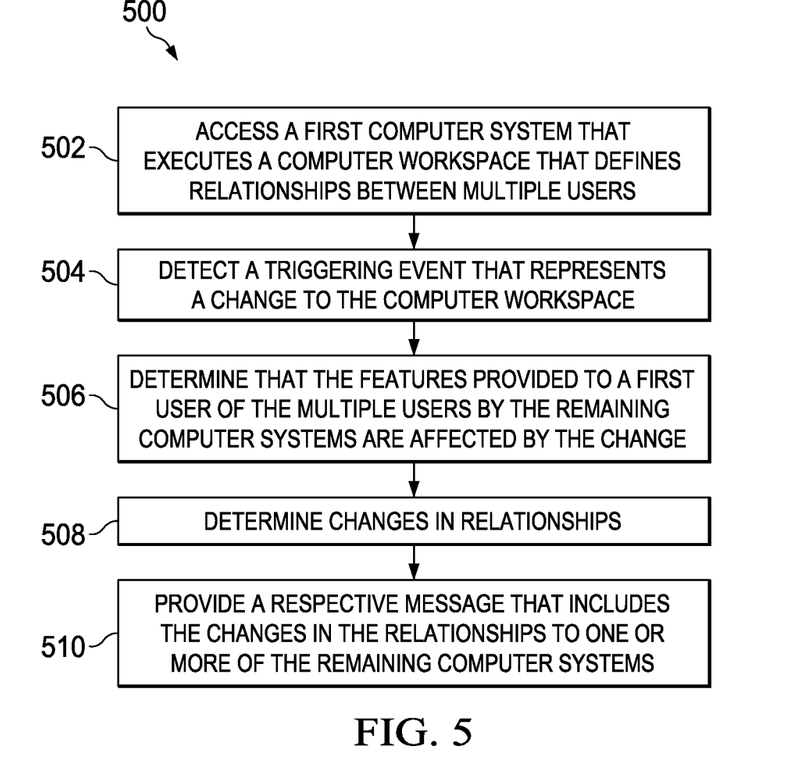
FIG. 5 is a flowchart of an example process to synchronize user relationship across computer systems implementing business applications.

FIG. 5 is a flowchart of an example process 500 to synchronize user relationships across computer systems implementing workspaces. The process 500 can be implemented as computer instructions stored on computer-readable media (for example, the computer-readable medium 152) and executable by data processing apparatus (for example, data processing apparatus 154). For example, the process 500 can be implemented by the relationship manager 102. At 502, a first computer system (for example, the first computer system 104) that provides features (for example, content or applications or both) accessible by multiple users is accessed by entering or accessing a collaboration workspace via a computer user-interface. The computer workspace defines relationships between the multiple users. The relationships can be defined implicitly and can be evaluated as the result of the meaning of this workspace or the business role of each user in the workspace or combinations thereof. The first computer system is included in multiple computer systems. Features provided to the multiple users by remaining computer systems of the multiple computer systems depends on the relationships between the multiple users.

At 504, a triggering event that represents a change to the computer workspace is detected. As described above, the change to the computer workspace can be a change in a relationship between a first user and remaining users of the multiple users. Alternatively, or in addition, the change to the computer workspace can be an addition or removal of one or more features provided by the workspace. At 506, it is determined that the features provided to a first user of the multiple users by the remaining computer systems are affected by the change to the computer workspace. At 508, changes in relationships (for example, due to user addition or removal or both) or the existence of relationships (for example, due to content addition or removal or both) between the first user and the remaining users responsive to the change to the computer workspace are determined. At 510, a respective message is provided to one or more of the remaining computer systems in response to detecting the triggering event. For example, a message is provided to one system when content or an application (or both) is added. The message is provided to multiple systems when users are added or removed (or both). The message includes the changes in the relationships between the first user and the remaining users if there was a user change. If there was a content change, then the message can include all relationship information in the workspace for all users.

Figure 6:
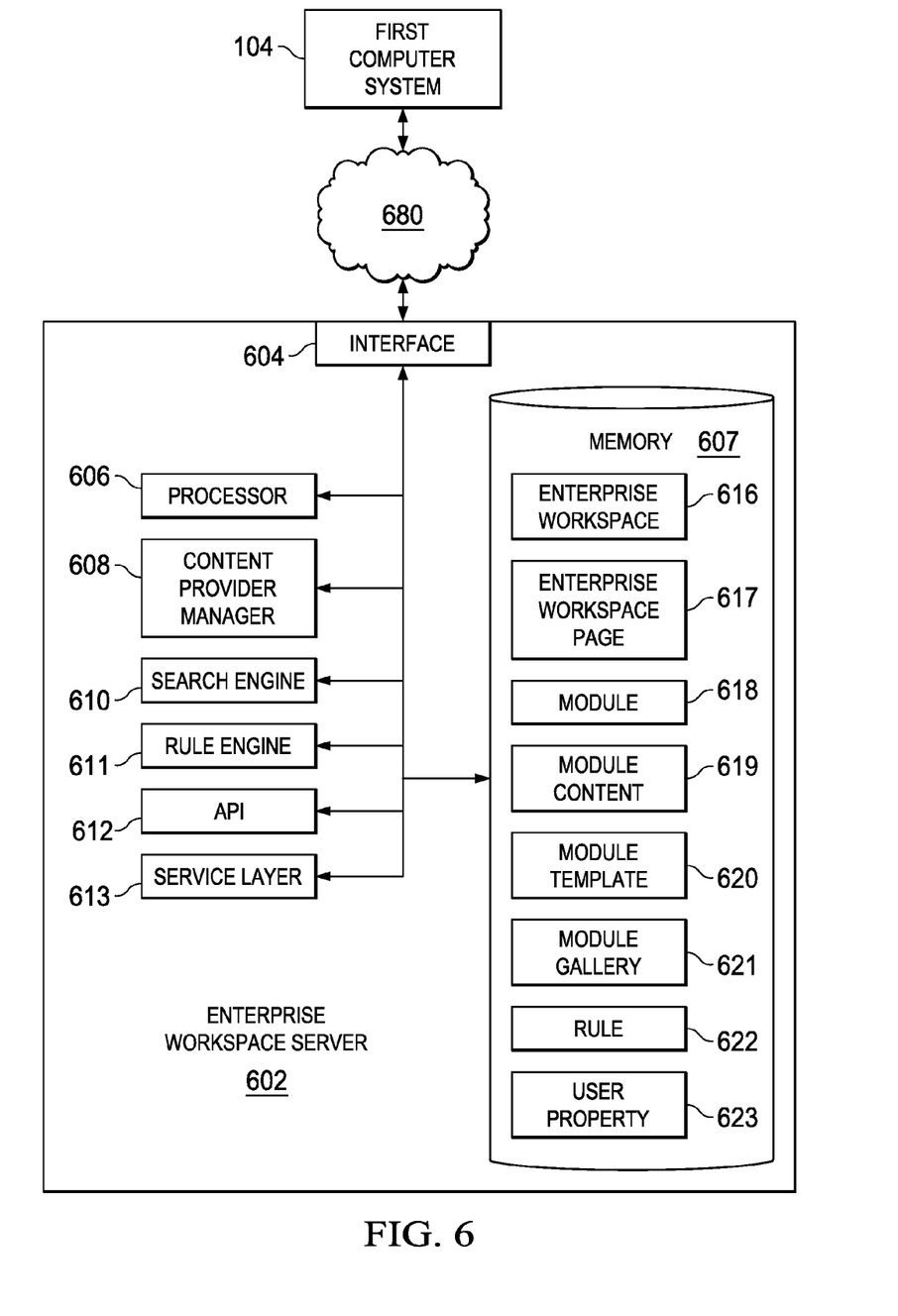
FIG. 6 is an example of a computer system of FIG. 1 connected to an example Enterprise Workspace Server.

FIG. 6 is an example of a computer system of FIG. 1 connected to an example Enterprise Workspace Server. FIG. 6 illustrates an example first computer system, such as the first computer system 104, which is communicably coupled with EWS server 602. One or more or all of the remaining interconnected computer systems can similarly be communicably coupled with the EWS server 602. The EWS server 602 is an electronic computing device operable to implement an EWS and to receive, transmit, process, store, or manage data and information associated with the first computer system 104. The EWS server 602 allows EWS users to compose, modify, delete, and deploy EWS pages. Through a graphical user interface (GUI), an EWS server 602 user, for example, using a client computer system 120, is provided with an efficient and user-friendly presentation of data provided by or communicated within the first computer system 104.

In general, the EWS server 602 is a server that stores a content provider manager 608, the relationship manager 102, a search engine 610, and a rule engine 611 where at least a portion of the content provider manager 608, the relationship manager 102, the search engine 610, or the rule engine 611 (or combinations of them) is executed using requests or responses (or both) sent from or to the client computer system 120. In some implementations, the EWS server 602 may store multiple content provider managers 608, relationship managers 102, search engines 610, or rule engines 611 (or combinations of them). In some implementations, the EWS server 602 may be a dedicated server meant to store and execute only a single content provider manager 608, relationship manager 102, search engine 610, or rule engine 611 (or combinations of them). In some implementations, the EWS server 602 may comprise a web server, where content provider manager 608, the relationship manager 102, the search engine 610, or the rule engine 611 (or combinations of them) represents one or more web-based applications accessed and executed by the client computer system 120 or directly at the EWS server 602 to perform the programmed tasks or operations of the content provider manager 608, the relationship manager 102, the search engine 610, or the rule engine 611 (or combinations of them). The EWS server 602 can include an application programming interface (API) 612 or a service layer 613 (or both) through which the various components of the EWS server 602 can interface with each other.

The EWS server 602 includes an interface 604 for communicating with other systems in a distributed environment (i.e., the interconnected computer systems) and the relationship manager 102. Generally, the interface 604 comprises logic encoded in software or hardware (or both) in a suitable combination and operable to communicate with one or more wired or wireless networks 680, such as, the Internet. The EWS server 602 includes a processor 606 which executes instructions and manipulates data to perform the operations of the EWS server 602. Specifically, the processor 606 executes the functionality required to receive and respond to requests from the client computer system 120, one or more of the interconnected computer systems, and the relationship manager 102. The EWS server 602 also includes a memory 607 that holds data for the EWS server 602. In some implementations, the memory 607 includes an EWS 616, an EWS page 617, a module 618, module content 619, a module template 620, a module gallery 621, a rule 622, and a user property 623.

The EWS is a central repository of knowledge. EWS generation may be performed either at design-time or runtime and may be based upon, for example, EWS properties, an EWS owner profile, EWS viewer properties, other suitable values or combinations thereof. For example, the EWS owner profile may include age, address, medical profile, etc. The EWS viewer profile may include role, relation to the EWS owner, location, etc. In some implementations, the EWS is associated with a context. For example, the EWS may be associated with a specific user, for example a particular patient, and a support group associated with the patient, for example, the patient's doctor, friends and family, etc. The EWS may be either personal or shared. The personal EWS is a private area where a single user can maintain personal content on a particular EWS page not accessible by other EWS users. A shared EWS is an area where multiple EWS users, for example the support group or friends and family of the heart patient, can access shared EWS pages. A shared EWS is assigned a role/permission policy and each EWS user may be provided a role and associated permission in the shared EWS. Roles may be, for example, workspace owner, workspace manager, workspace member or combinations of them. Associated permissions may be, for example, the ability to create, rename, or delete EWS pages and view or update particular content associated with EWS pages or specific modules associated with the EWS pages. In some implementations, EWS users may have multiple permission levels/roles. In some implementations, users can also customize the EWS with different layouts, branding, and themes. In some implementations, an EWS instance is created from a reusable EWS template. An EWS template has the same or similar structure as an EWS and is an EWS associated with a template tag but not an actual EWS instance. If a new instance of an EWS is created based on an EWS template, the EWS template is copied and used as the base for the EWS instance.

An enterprise portal (EP) (also known as an enterprise information portal (EIP) or a corporate portal) is a framework for integrating information, people, and processes across organizational boundaries. An EP can provide a secure unified access point, for example, in the form of a web-based user interface. The EP can be designed to aggregate and personalize information through application-specific portals. The EP can be a de-centralized content contribution and content management system, which maintains updated information almost all the time. Using a web browser, an enterprise portal user can begin work after having been authenticated in the EP. In this manner, the EP can offer a single point of access to information, enterprise applications, and services both inside and outside an organization. EPs can present information from diverse sources in a unified and structured way, and provide additional services, such as dashboards, an internal search engine, e-mail, news, navigation tools, and various other features. EPs can be used by enterprises for providing their employees, customers, and possibly additional users with a consistent look and feel, and access control and procedures for multiple applications, which otherwise would have been separate entities altogether.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

accessing a first computer system to define relationships between a plurality of users associated with a computer collaboration workspace within an enterprise portal, wherein the computer collaboration workspace is implemented on the first computer system and provides features accessible by the plurality of users, wherein the first computer system is included in a plurality of computer systems, wherein features provided to the plurality of users by remaining computer systems of the plurality of computer systems through the computer collaboration workspace depend on the relationships between the plurality of users associated with the computer collaboration workspace, wherein the relationships between the plurality of users are defined based on roles assigned to the plurality of users in context of the computer collaboration workspace, and wherein the remaining computer systems of the plurality of computer systems determine permissions of the plurality of users to access features based on the relationships between the plurality of users;

detecting a triggering event that represents a change to the computer collaboration workspace, wherein the change to the computer collaboration workspace is a change to a role assigned to a first user in context of the computer collaboration workspace;

determining changes in relationships between the first user and the remaining users responsive to the change to the role assigned to the first user;

providing, to one or more of the remaining computer systems, a respective message that includes an instruction to synchronize the changes in the relationships between the first user and the remaining users, in response to detecting the triggering event, wherein the instruction causes the one or more of the remaining computer systems to modify permissions of at least one of the remaining users associated with the computer collaboration workspace based on the changes in the relationships, wherein the modified permissions represent updated relationships between the at least one remaining user and the first user based on the change to the role assigned to the first user; and tracking the providing of the respective message to the one or more of the remaining computer systems by displaying status of the providing of the respective message via a user interface on a display device.

2. The method of claim 1, wherein providing, to the remaining computer systems, a respective message comprises generating a respective message that is specific to each of the remaining computer systems.

3. The method of claim 1, wherein providing, to the remaining computer systems, a respective message comprises generating a common message for the remaining computer systems.

4. The method of claim 1, wherein the tracking comprises:
tracking to determine that a respective message has been generated; and
tracking to determine that the generated message has been provided to a remaining computer system.

5. The method of claim 1, wherein the tracking further comprises at least one of determining that a generation of a respective message has not started, determining that the generation of the respective message is in progress, determining that a providing of the respective message has failed, determining that the providing of the respective message has succeeded, or determining that the respective message needs to be resent.

6. A non-transitory computer-readable medium storing instructions executable by data processing apparatus to perform operations comprising:

accessing a first computer system to define relationships between a plurality of users associated with a computer collaboration workspace within an enterprise portal, wherein the computer collaboration workspace is implemented on the first computer system and provides features accessible by the plurality of users, wherein the first computer system is included in a plurality of computer systems, wherein features provided to the plurality of users by remaining computer systems of the plurality of computer systems through the computer collaboration workspace depend on the relationships between the plurality of users associated with the computer collaboration workspace, wherein the relationships between the plurality of users are defined based on roles assigned to the plurality of users in context of the computer collaboration workspace, and wherein the remaining computer systems of the plurality of computer systems determine permissions of the plurality of users to access features based on the relationships between the plurality of users;

detecting a triggering event that represents a change to the computer collaboration workspace, wherein the change to the computer collaboration workspace is a change to a role assigned to a first user in context of the computer collaboration workspace;

determining changes in relationships between the first user and the remaining users responsive to the change to the role assigned to the first user;

providing, to one or more of the remaining computer systems, a respective message that includes an instruction to synchronize the changes in the relationships between the first user and the remaining users, in response to detecting the triggering event, wherein the instruction causes the one or more of the remaining computer systems to modify permissions of at least one of the remaining users associated with the computer collaboration workspace based on the changes in the relationships, wherein the modified permissions represent updated relationships between the at least one remaining user and the first user based on the change to the role assigned to the first user; and tracking the providing of the respective message to the one or more of the remaining computer systems by displaying status of the providing of the respective message via a user interface on a display device.

7. The medium of claim 6, wherein providing, to the remaining computer systems, a respective message comprises generating a respective message that is specific to each of the remaining computer systems.

8. The medium of claim 6, wherein providing, to the remaining computer systems, a respective message comprises generating a common message for the remaining computer systems.

9. The medium of claim 6, wherein the tracking comprises:
tracking to determine that a respective message has been generated; and
tracking to determine that the generated message has been provided to a remaining computer system.

10. A system comprising:

data processing apparatus; and a computer-readable medium storing instructions executable by the data processing apparatus to perform operations comprising:

accessing a first computer system to define relationships between a plurality of users associated with a computer collaboration workspace within an enterprise portal, wherein the computer collaboration workspace is implemented on the first computer system and provides features accessible by the plurality of users, wherein the first computer system is included in a plurality of computer systems, wherein features provided to the plurality of users by remaining computer systems of the plurality of computer systems through the computer collaboration workspace depend on the relationships between the plurality of users associated with the computer collaboration workspace, wherein the relationships between the plurality of users are defined based on roles assigned to the plurality of users in context of the computer collaboration workspace, and wherein the remaining computer systems of the plurality of computer systems determine permissions of the plurality of users to access features based on the relationships between the plurality of users;

detecting a triggering event that represents a change to the computer collaboration workspace, wherein the change to the computer collaboration workspace is a change to a role assigned to a first user in context of the computer collaboration workspace;

determining changes in relationships between the first user and the remaining users responsive to the change to the role assigned to the first user;

providing, to one or more of the remaining computer systems, a respective message that includes an instruction to synchronize the changes in the relationships between the first user and the remaining users, in response to detecting the triggering event, wherein the instruction causes the one or more of the remaining computer systems to modify permissions of at least one of the remaining users associated with the computer collaboration workspace based on the changes in the relationships, wherein the modified permissions represent updated relationships between the at least one remaining user and the first user based on the change to the role assigned to the first user; and tracking the providing of the respective message to the one or more of the remaining computer systems by displaying status of the providing of the respective message via a user interface on a display device.

11. The medium of claim 6, wherein the tracking further comprises at least one of determining that a generation of a respective message has not started, determining that the generation of the respective message is in progress, determining that a providing of the respective message has failed, determining that the providing of the respective message has succeeded, or determining that the respective message needs to be resent.

12. The system of claim 10, wherein providing, to the remaining computer systems, a respective message comprises generating a respective message that is specific to each of the remaining computer systems.

13. The system of claim 10, wherein providing, to the remaining computer systems, a respective message comprises generating a common message for the remaining computer systems.

14. The system of claim 10, wherein the tracking comprises:

tracking to determine that a respective message has been generated; and tracking to determine that the generated message has been provided to a remaining computer system.

15. The system of claim 10, wherein the tracking further comprises at least one of determining that a generation of a respective message has not started, determining that the generation of the respective message is in progress, determining that a providing of the respective message has failed, determining that the providing of the respective message has succeeded, or determining that the respective message needs to be resent.

* * * * *